United States Patent
Sun et al.

(10) Patent No.: US 12,170,591 B1
(45) Date of Patent: Dec. 17, 2024

(54) ONLINE OPTIMIZATION METHOD FOR POWER CONSUMPTION POLICY OF TERMINAL OF INTERNET OF THINGS

(71) Applicant: Nanjing University of Information Science and Technology, Jiangsu (CN)

(72) Inventors: Le Sun, Jiangsu (CN); Yuyan Guo, Jiangsu (CN)

(73) Assignee: Nanjing University of Information Science and Technology, Nanjing (CN)

(*) Notice: Subject to any disclaimer, the term of this patent is extended or adjusted under 35 U.S.C. 154(b) by 0 days.

(21) Appl. No.: 18/784,813

(22) Filed: Jul. 25, 2024

(30) Foreign Application Priority Data

Jan. 23, 2024  (CN) .......................... 202410091108.X (51) Int. Cl.
*H04L 41/0803* (2022.01)
*G16Y 40/35* (2020.01)
*H04L 67/12* (2022.01)
*H04L 69/324* (2022.01)

(52) U.S. Cl.
CPC .......... *H04L 41/0803* (2013.01); *G16Y 40/35* (2020.01); *H04L 67/12* (2013.01); *H04L 69/324* (2013.01)

(58) Field of Classification Search
CPC ............................ H04L 41/0803; G16Y 40/35
See application file for complete search history.

(56) References Cited

U.S. PATENT DOCUMENTS

| | | | |
|---|---|---|---|
| 10,740,793 B1 | 8/2020 | Sussman et al. | |
| 2010/0074141 A1* | 3/2010 | Nguyen | H04L 41/22 370/254 |
| 2021/0026428 A1* | 1/2021 | Olarig | G06F 1/206 |
| 2023/0362175 A1* | 11/2023 | Li | H04L 41/16 |

FOREIGN PATENT DOCUMENTS

| | | |
|---|---|---|
| CN | 114189892 A | 3/2022 |
| CN | 115988618 A | 4/2023 |
| CN | 116744417 A | 9/2023 |
| WO | 2013138814 A1 | 9/2013 |

* cited by examiner

*Primary Examiner* — Jason D Recek (57) ABSTRACT

Disclosed is an online optimization method for a power consumption policy of a terminal of Internet of things (IoT), including: performing comprehensive scanning on a user terminal and a link, and obtaining a link behavior graph; inputting the link behavior graph into a simulation based optimization (SBO) system to obtain power consumption parameters for minimizing power consumption of the user terminal; performing centralized storage on the link behavior graph and the power consumption parameters; regularly sending, by the user terminal, operation data to a server, and evaluating, by the server, whether a power consumption policy needs to be optimized; and issuing, by the server, a parameter update instruction to complete the upgrading of the power consumption policy of the user terminal. In the present disclosure, the update of the power consumption policy of the user terminal can be conveyed more quickly and more efficiently.

1 Claim, 3 Drawing Sheets

ONLINE OPTIMIZATION METHOD FOR POWER CONSUMPTION POLICY OF TERMINAL OF INTERNET OF THINGS

CROSS-REFERENCE TO RELATED APPLICATIONS

This application claims priority of Chinese Patent Application No. 202410091108.X, filed on Jan. 23, 2024, the entire contents of which are incorporated herein by reference.

TECHNICAL FIELD

The present disclosure relates to the technical field of graph neural networks, and in particular to an online optimization method for a power consumption policy of a terminal of Internet of things (IoT).

BACKGROUND

There are a large number of battery-powered user terminal devices in existing IoT online devices. These devices demand the power consumption of the user terminal devices while maintaining the stable connection of links. To make the power consumption of the user terminal device as low as possible, user terminal device manufacturers have developed a number of hardware devices supporting low power consumption, matched with corresponding software low power consumption policies and link protocols supporting low power consumption, so that the user terminal can enter a standby sleep state most of the time, and only be active to process transactions when necessary, to save the power consumption of the user terminal and prolong the service life of the battery.

However, due to the implementation differences of link device manufacturers providing communication support, the user terminal device manufacturers will face numerous link compatibility problems when formulating low power consumption policies, which seriously affect the power consumption of the user terminal device on some links, resulting in the frequent battery replacement of the user terminal device, thereby causing energy waste and user complaints. To avoid the above situations as much as possible, the user terminal device manufacturers will choose a more conservative and fault-tolerant power consumption policy as far as possible in the formulation of low power consumption policies to achieve the balance between user terminal power consumption and link compatibility.

In addition, some user terminal device manufacturers will try to take some targeted policies to reduce the concession of user terminal power consumption to compatibility through a model of link device, and choose some more aggressive power consumption parameters to save power consumption. For example, in a wireless fidelity (WiFi) link, many user device manufacturers will adopt targeted low power consumption policies according to different models of routers. Therefore, due to the consideration of router compatibility, the power consumption policy algorithm of terminal device becomes more and more complex, which occupies the originally strained code space and terminal computing resources. In addition, with the update iteration of link mating products, the power consumption parameters (power consumption policy related codes) of the user terminal device also need to be updated and adjusted continuously. Since the current mainstream practice in the industry is to remotely download and re-burn device firmware through an over-the-air technology (ota), users are therefore required to upgrade the firmware frequently, with a big impact on the user experience.

SUMMARY

The technical problems are solved by an online optimization method for a power consumption policy of a terminal of IoT provided by the present disclosure. A link behavior graph is obtained according to link behavior data and inputted to a simulation based optimization (SBO) system. Minimum power consumption parameters of a user terminal are obtained by using a similarity algorithm and a graph neural network generation algorithm to more efficiently and quickly complete the upgrade of a power consumption policy of the user terminal.

The technical problems are solved by the following technical solutions of the present disclosure.

The present disclosure provides an online optimization method for a power consumption policy of a terminal of IoT, including:

S1, performing comprehensive scanning on a user terminal and a link in an experimental environment, and modeling the link according to link behavior data to obtain a link behavior graph (the link behavior representing all link layer information interactions occurring between the user terminal and the link, usually following a certain link layer protocol);

S2: inputting the link behavior graph obtained in step S1 into an SBO system to obtain power consumption parameters for minimizing power consumption of the user terminal;

S3, performing centralized storage on link behavior graphs of all user terminal links in step S1 and the power consumption parameters corresponding to the behavior graph in step S2, and constructing a link behavior library according to a one-to-one corresponding relationship thereof, in which the link behavior library contains all link behavior graphs obtained through step S1; a main purpose of constructing the link behavior library is to facilitate directly obtaining power consumption parameters corresponding to minimum power consumption through the link behavior graph in a production stage, thereby saving the time for obtaining the power consumption parameters of minimum power consumption through the SBO system and improving the power consumption optimization efficiency in a production environment;

S4: regularly sending, by the user terminal, operation data and collected user link behavior data to a server in a production environment, and evaluating, by the server, whether the power consumption policy of the user terminal needs to be optimized, an original state being maintained if the evaluation finds that optimization is not needed until the user terminal collects data next time, and step S5 being entered if optimization is needed;

S5: generating, by the server, a link behavior subgraph according to the link behavior data collected by the user terminal, and performing behavior graph matching on the link behavior subgraph with the link behavior library using a similarity algorithm, power consumption parameters of minimum power consumption corresponding to a matched link behavior graph from the link behavior library being acquired and step S7 being entered if the matching is successful, otherwise, step S6 being entered;

S6: performing secondary generation on the link behavior subgraph generated in step S5 through a graph neural network generation algorithm to obtain a complete link behavior graph, inputting the link behavior graph into the SBO system in step S2 again, and obtaining power consumption parameters of minimum power consumption of a new link; and S7: transmitting, by the server, the power consumption parameters of minimum power consumption to the user terminal through networking, and issuing a parameter update instruction to complete the upgrading of the power consumption policy of the user terminal.

Further, in step S1, the obtaining a link behavior graph includes the following sub-steps.

In S101, a certain to-be-tested link is selected to build a test environment, the stable connection state of the user terminal and the to-be-tested link is controlled, interaction behaviors and relevant data between the user terminal and the link are monitored by using a link analysis tool, including, but not limited to, a category of interaction behaviors, specific content, behavior time, processing delay and transmission delay; and a real-time current and a working state of the user terminal are sampled and analyzed by using a power consumption analysis device and a logic analysis device to obtain a sectional working state and a sectional statistical current (i.e., average current) of each user terminal behavior.

It is ensured that the power consumption analysis device has a normal current sampling function. Most power consumption analysis devices on the market can meet the requirements. The device will calculate an average current of the user terminal in different working states, which is used as the basis for the simulation system to calculate power consumption. Therefore, in theory, the higher the accuracy of power consumption analysis device, the more accurate the subsequent power consumption simulation calculation and the final optimization parameters.

It is ensured that the logic analysis device has a sampling rate high enough to correctly sample software stub points.

In S102: the user terminal is controlled to maintain a passive response state, an active packet sending behavior of the link is monitored by using a packet grabber, and subsequent interaction behaviors and relevant data between the user terminal and the link are recorded.

In S103: the interaction behaviors possibly occurring in the link are summarized according to a link protocol to obtain a test behavior set of the link, each item in the test behavior set is sequentially selected as a to-be-tested behavior, the user terminal is controlled to initiate the to-be-tested behavior to the link, the interaction behaviors between the user terminal and the link are monitored by using the packet grabber, and the relevant data is recorded.

In S104: the interaction behaviors acquired in steps S102 and S103 are classified and summarized, a part belonging to user terminal behaviors constituting a user terminal behavior table, in which field contents of the table include but are not limited to a category, specific content, behavior time, processing delay, transmission delay, a sectional working state of the user terminal behavior and a corresponding average current; and a part belonging to the link behavior generating a link behavior graph of the link.

In S105: steps S101 to S104 are repeated until all to-be-tested links generate link behavior graphs. It is to be noted that different to-be-tested links generate different link behavior graphs, and these link behavior graphs will constitute a link behavior library for subsequent use. Unlike the link behavior graph, there is only one user terminal behavior table, which is commonly maintained by the testing of all to-be-tested links.

Further, in step S104, the link behavior graph includes nodes and edges, the node representing behavior content of the link, which is usually a packet sending behavior, and the node includes but is not limited to a behavior category, a behavior time, a processing delay and a transmission delay.

An edge represents a triggering condition of a behavior, and (a directed edge) can be divided into two types according to different triggering modes. A first category of edge represents that a directed link behavior is triggered by a behavior of a user terminal, and is usually taken as a reply packet of a certain request of the user terminal, characterized in that a weight on the edge corresponds to one item in a behavior table of the user terminal; and a second category of edge is an active behavior of the link, all the active behaviors of the link are specified to be triggered by a timer, and the weight on the edge is a current value of the timer for cooperating with simulation, zeroing the weight represents the immediate triggering of the behavior. According to the second category of mechanism that the behavior is triggered once the edge returns to zero, the sequential triggering of multiple active behaviors on the link is actually realized, which can satisfy the modeling of some complex links and scenarios without losing the accuracy of power consumption calculation.

Further, in step S4, the determining whether optimization is needed includes the following steps.

The main method for evaluating whether the power consumption policy of the user terminal needs to be optimized according to the operation data of the user terminal is threshold detection, that is, a time proportion of the user terminal in a sleep state within a period of time is recorded, optimization being needed when the time proportion is lower than a threshold value, otherwise, optimization being not needed.

Further, in step S5, the matching includes the following sub-steps.

In S501: the link behavior graph is generated by the server according to the link behavior data collected by the user terminal. Here, since a sampling time of the user terminal within a single sampling period is limited, the generated link behavior graph generally contains only a part of the link behavior, and is referred to as the generation of a link behavior subgraph.

In S502: all link behavior graphs are traversed in the link behavior library, a similarity with the link behavior subgraph is calculated, and a link behavior graph with the highest similarity is obtained. If the highest similarity reaches a preset similarity threshold value, it can be considered that the link behavior subgraph is successfully matched in the link behavior library, power consumption parameters of minimum power consumption corresponding to the matched link behavior graph are acquired, and step S7 is entered; otherwise, step S6 is entered.

Further, in step S501, the generating the link behavior subgraph includes the following sub-steps.

In S5011: all the user terminal behaviors in the link behavior data are traversed, a corresponding item in the user terminal behavior table is found and attributes of parameters are updated to cause attribute data in the user terminal behavior table to be consistent with that in the link behavior data.

In S5012: all link behaviors in the link behavior data are traversed, each link (sending) behavior corresponding to a node, and the attribute of the node including, but not limited to, a sending time and a transmission delay of a node behavior.

In S5013: a triggering condition corresponding to each link behavior is parsed according to the link behavior data and constructed in the form of an edge in the behavior graph.

Further, in step S502, the matching includes the following sub-steps.

In S5021: the link behavior subgraph and the matched link behavior graph are represented as an adjacency matrix and a node feature matrix of the graph.

In S5022, a graph matching model based on graph convolutional networks (GCNs) is constructed for learning a matching relationship between a link behavior subgraph and a matched link behavior graph. Taking the link behavior subgraph as an input graph and the matched link behavior graph as a target graph, and matching features of nodes are learned through the graph matching model based on GCNs.

In S5023: a matching score (cosine similarity) between nodes is calculated by using the learned matching feature.

In S5024: a node matching result between the link behavior subgraph and the matched link behavior graph is outputted according to the calculated matching score; and model parameters can be adjusted according to the matching result through several rounds of iteration and optimization to improve the matching accuracy and optimization effect. The aim of the whole process is to continuously optimize the matching to ensure the accurate matching of nodes between the link behavior subgraph and the matched link behavior graph.

Further, in step S5023, a calculation formula of a cosine similarity is:

$$\text{Cosine Similarity}(v_i, v_j) = \frac{\sum_{k=1}^{G} v_{i,k} \times v_{j,k}}{\sqrt{\sum_{k=1}^{G} v_{i,k}^2} \times \sqrt{\sum_{k=1}^{G} v_{j,k}^2}}$$

where Cosine Similarity($v_i$, $v_j$) represents a cosine similarity between two vectors $v_i$ and $v_j$, $v_i$ represents an $i^{th}$ vector, $v_j$ represents a $j^{th}$ vector in a set of neighbor nodes of $v_i$, k represents dimensional indexing of the vector, G represents a dimension of the vector, $v_{i,k}$ represents a component of the vector $v_i$ in a $k^{th}$ dimension, and $v_{j,k}$ represents a component of the vector $v_j$ in a $k^{th}$ dimension.

Further, in step S6, the obtaining a complete link behavior graph includes the following sub-steps.

In S601, the link behavior subgraph is coded emphatically, and subgraph data is inputted into the graph matching model based on GCNs in the forms of adjacency matrix and node feature matrix. The graph neural network learns the node feature representation of subgraph through multi-layer node feature propagation and aggregation.

In S602, in the process of forward propagation of GCNs, node features of the link behavior subgraph are obtained and fused, and the node features are averaged or pooled to obtain the feature representation of a whole subgraph.

In S603, a generative adversarial network is selected after entering a graph generation stage, and a structure of a complete graph is gradually constructed, including the generation of new nodes and edges. At the same time, node features are generated through random initialization or other means, the generated nodes are given features, and the generated node features and the node features of the link behavior subgraph are fused to obtain the feature representation of a final complete link behavior graph.

In S604, by removing repeated edges and ensuring the connectivity of the graph, the structure of the complete link behavior graph is optimized and repaired, and a complete link behavior graph which is more practical and meets the application requirements of the link behavior graph is obtained.

Compared with the prior art, the present disclosure has the following obvious technical effects by adopting the above technical solutions.

In the present disclosure, the link behavior graph is constructed, which, combined with graph neural network and related deep learning technology, is utilized to optimize the power consumption problem of the user terminal online. By using the characteristic of graph network capable of handling complex problems, the behaviors of user terminal links are embedded, and most of the link behaviors on the market can be constructed by training models, so the method has great compatibility. Due to the use of online technology, the update of the power consumption policy of the user terminal can be conveyed quickly and more efficiently. Based on these two points, the method can further optimize the power consumption on the original basis and further reduce the electricity consumption to achieve a competitive power consumption optimization effect.

DETAILED DESCRIPTION

In the following, the technical solutions of the present disclosure are clearly and completely described with reference to the drawings in the specification and specific implementations. Obviously, the described embodiments are only some, rather than all embodiments of the present disclosure. Based on the embodiments in the present disclosure, all other embodiments obtained by those of ordinary skill in the art belong to the scope of protection of the present disclosure.

Figure 1:
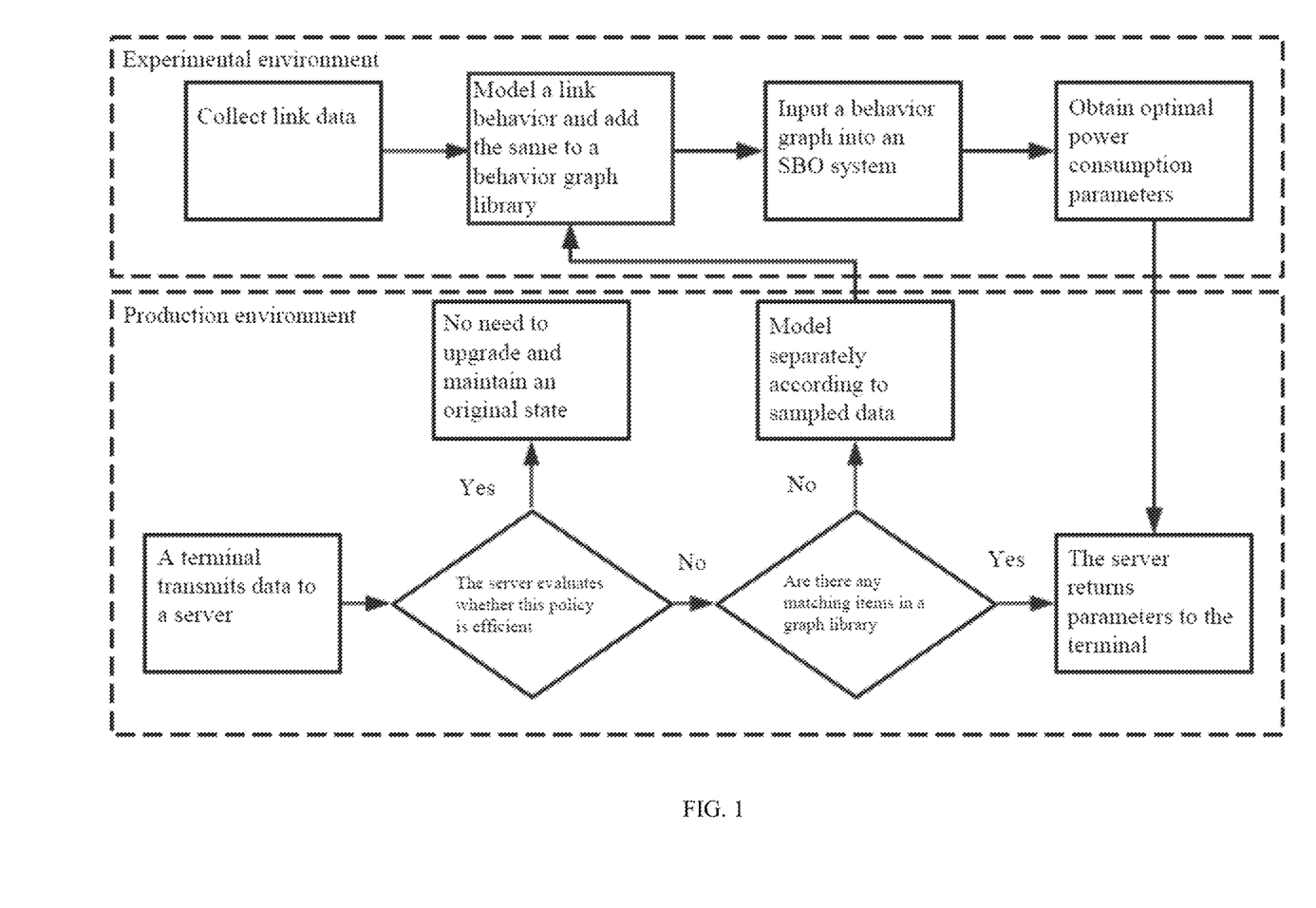
FIG. 1 is a flow chart of an overall implementation of the present disclosure.

Taking a more typical WiFi link in an IoT link as an example, the present disclosure provides an online optimization method for a power consumption policy of a terminal of IoT, as shown in FIG. 1, including the following steps:

In S1: comprehensive scanning is performed on a user terminal and a link, and a link behavior graph is obtained according to behavior data of the link, including the following specific steps.

In S101, with regard to a WiFi link, a WiFi packet grabbing card and WiFi protocol analysis software are used to monitor interaction behaviors and relevant data between the user terminal and the link, including, but not limited to, a category of interaction behavior, specific content, behavior time, processing delay and transmission delay. A power consumption analysis device and a logic analysis device are used to sample and analyze the real-time current and working state of the user terminal, and a sectional working state and a sectional statistical current of each user terminal behavior are obtained.

Figure 2:
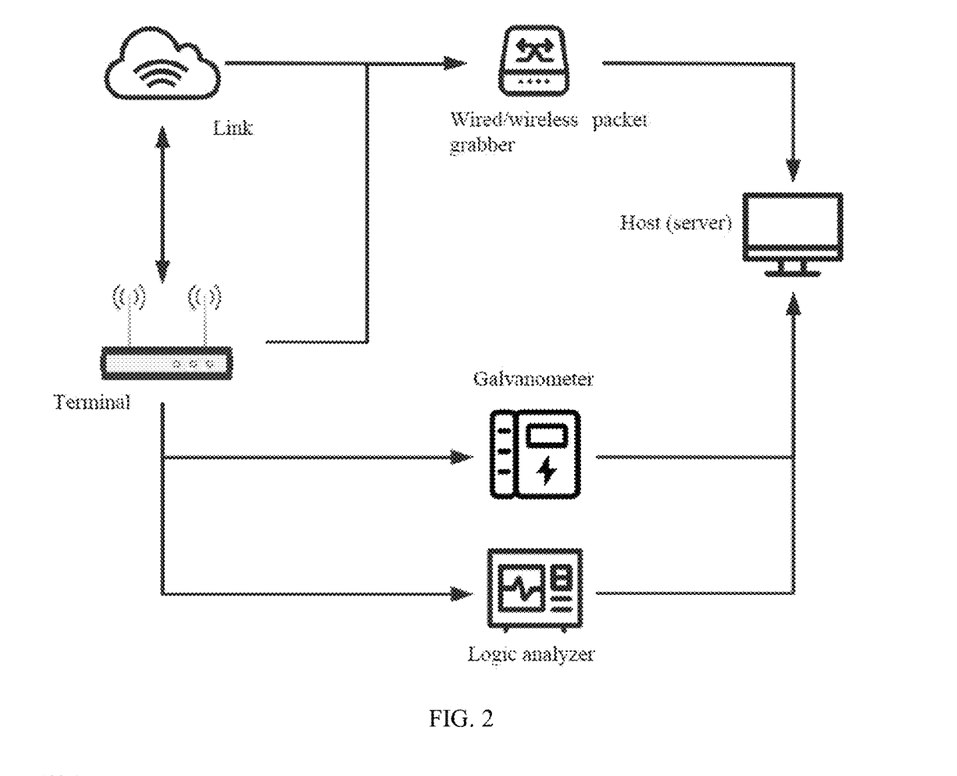
FIG. 2 is a hardware connection diagram in an experimental environment in an embodiment of the present disclosure.

In the embodiment, an experimental environment as shown in FIG. 2 is built using the WiFi packet grabbing card and the WiFi protocol analysis software tool. In addition to the user terminal and the link, a host (serving as a server at the same time), a packet grabber, a power consumption analyzer and a logic analyzer are also included. On the one hand, the host is connected to the packet grabber, the power consumption analyzer and the logic analyzer and serves as a main control end of a test instrument; on the other hand, the host runs a link behavior graph generation program and an SBO system to complete the task of constructing a link behavior library in the experimental environment.

In addition, to obtain a sectional state of the user terminal behavior, a stub point is added to a software code controlling the state switching of the user terminal, and the insertion of the stub point is realized by adding a code controlling the inversion of a general-purpose input/output (GPIO) signal. The logic analyzer is used to capture the inversion of the GPIO signal and to count a time interval between two inversions as the time in different operating states in the user terminal behavior. To ensure the user terminal state time statistics are correct, it is to be ensured that a sampling rate of the logic analyzer is at least twice higher than a switching frequency of the GPIO signal.

In S102: the user terminal is controlled to maintain a passive response state, an active packet sending behavior of the link is monitored by using a packet grabber, and subsequent interaction behaviors and relevant data between the user terminal and the link are recorded.

In S103: the interaction behaviors possibly occurring in the link are summarized according to a link protocol to obtain a test behavior set of the link, each item in the test behavior set is sequentially selected as a to-be-tested behavior, the user terminal is controlled to initiate the to-be-tested behavior to the link, the interaction behaviors between the user terminal and the link are monitored by using the packet grabber, and the relevant data are recorded.

In S104: the interaction behaviors acquired in steps S102 and S103 are classified and summarized, a part belonging to user terminal behaviors constituting a user terminal behavior table, in which field contents of the table include but are not limited to a category, specific content, behavior time, processing delay, transmission delay, a sectional working state of the user terminal behavior and a corresponding average current; and a part belonging to the link behavior generating a link behavior graph of the link.

The link behavior graph includes nodes and edges, the node representing behavior content of the link, which is usually a packet sending behavior, and the node includes but is not limited to a behavior category, a behavior time, a processing delay and a transmission delay.

An edge represents a triggering condition of a behavior, and (a directed edge) can be divided into two types according to different triggering modes. A first category of edge represents that a directed link behavior is triggered by a behavior of a user terminal, and is usually taken as a reply packet of a certain request of the user terminal, characterized in that a weight on the edge corresponds to one item in a behavior table of the user terminal; and a second category of edge is an active behavior of the link, all the active behaviors of the link are specified to be triggered by a timer, and the weight on the edge is a current value of the timer for cooperating with simulation, zeroing the weight represents the immediate triggering of the behavior. According to the second category of mechanism that the behavior is triggered once the edge returns to zero, the sequential triggering of multiple active behaviors on the link is actually realized, which can satisfy the modeling of some complex links and scenarios without losing the accuracy of power consumption calculation.

According to the WiFi link in the embodiment, generation rules of the link behavior graph are as follows.

Rule 1: nodes of a link behavior graph represent any packet sending behavior of a router, and the number of packets is required to be 1. If there are multiple packets to be sent in sequence at the same time, multiple nodes connected by a directed edge with a weight of 0 are required to represent.

Rule 2: the directed edge with a weight of 0 in the link behavior graph represents that a triggering mode of the packet sending behavior of the node indicated is an immediate trigger, and the link will immediately start a next packet sending behavior after completing a previous packet sending behavior without waiting for other triggering conditions.

Rule 3: a directed edge on the link behavior graph with a weight of a positive integer n represents a delay-triggered behavior, and the weight n represents a delay time. As the simulation proceeds, the weight on the edge will automatically decrease until it is 0, and the behavior can be triggered when the weight is reduced to 0. If the directed edge points to the node itself, it is represented that the node is a periodic (active) link behavior, and the weight n can also be considered as a delay time (period); and different from behaviors pointing to other nodes, the weight on the edge will be reset to the behavior period immediately after the behavior pointing to itself is triggered. A directed edge whose weight is an index in the user terminal behavior table represents that a triggering condition of the link behavior is a user terminal behavior, and the node behavior pointed by the directed edge is triggered by the user terminal behavior as a response to the user terminal behavior.

Figure 3:
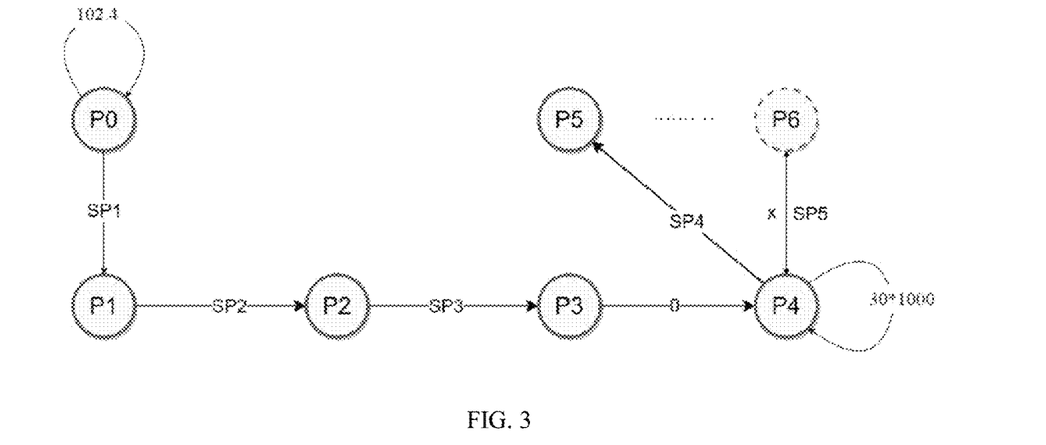
FIG. 3 is an exemplary diagram of a link behavior graph in an embodiment of the present disclosure.

In the embodiment, as shown in FIG. 3, a link behavior graph of one of the links is:

a node P0 represents that a router sends a beacon frame every 102.4 ms;

SP1 represents that a terminal sends a probe request interception request;

P1 represents that a router replies to a probe response;

SP2 represents that a terminal sends an authentication request of authentication open seq1;

P2 represents that a router replies to authentication open seq2;

SP3 represents that a terminal sends an association request;

P3 represents that a router replies to an association response;

P4 represents that a router sends a null data packet every 30 s after a terminal accesses a network to confirm whether the terminal is still in the network;

SP4 represents that a terminal sends a data packet;

P5 represents that a router replies to an ack response packet;

P6 represents that a router sends a data packet after x seconds; and

SP5 represents that a terminal sends an ack response packet.

The above SP1-SP5 are all items in a user terminal behavior table. The user terminal behavior table contains all communication behaviors (packet sending) which can be initiated by a terminal, and in addition, information about an execution time and a sending delay required by each packet sending behavior is recorded.

A stable connection state is maintained between the user terminal and the link, and the user terminal is controlled not to perform any active action (it is to be noted that a passive response is necessary, otherwise it may cause the user terminal to disconnect from a to-be-tested link), and at the time, an active behavior of the link and a respondent behavior of the user terminal are monitored by using a packet grabber, and recorded in a link behavior graph and a user terminal behavior table, respectively.

Each item in a test behavior set is tested. The test behavior set is interactively constructed by packets specified in a link protocol, and may include hundreds of to-be-tested behaviors. The test behavior set usually differs according to implementation modes of the link provider (understanding of the protocol). Through the full test of the test behavior set, the clear understanding of the actual behavior of the link can be obtained, which will be stored in the database in the form of link behavior graphs.

In S105: steps S101 to S104 are repeated until all to-be-tested links generate link behavior graphs.

In S2: the link behavior graph in step S1 is inputted into an SBO system to obtain power consumption parameters for minimizing power consumption of the user terminal, including the following specific steps.

In S201, four working states of a user terminal are defined, s1=Active state, s2=Sleep state, s3=Transmit state and s4=Receive state; average currents of the user terminal in different states of c1=5 mA/min, c2=0.1 mA/min, c3=50 mA/min and c4=20 mA/min are obtained through a power consumption analysis device; and times of t1=10 s, t2=75 s, t3=5 s and t4=10 s are counted when the user terminal is in various states in a simulation process, and the average power consumption of the user terminal P=(c1*t1+c2*t2+c3*t3+c4*t4)/(t1+t2+t3+t4)*V=(5*10+0.1*75+50*5+20*10)/100*3.3=16.7475 m W, where V is an input voltage of the user terminal, and the simulation assumes that the input voltage of the user terminal is fixed and consistent with the input voltage of the user terminal in the experimental environment, both being 3.3 V.

In S202, a power consumption policy of the user terminal is characterized by using simulation parameters.

In S203, a genetic algorithm is selected as an optimization algorithm of the SBO system, and a population is initialized. An individual in the population is a power consumption policy; and a set of power consumption parameters is expressed as T=(p1, p2, p3 . . . , pN), and pN represents an $N^{th}$ power consumption parameter. These power consumption parameters have an influence on the behavior of a user terminal and a link in the simulation (determined by a user terminal program and a router behavior graph), thereby affecting the simulation power consumption of the user terminal; and the initialization of population is generated by a random number complying with a boundary condition of the power consumption parameter.

In S204, the calculation of a fitness of population: a power consumption parameter vector T of each individual is inputted into the user terminal program of the simulation system, the simulation is started and the average power consumption of the user terminal is calculated. According to a calculation formula of fitness $$f = \frac{1}{\tau^P}:$$

where τ is a preset fitness calculation parameter, and when τ>1, the fitness of individuals in the population can be obtained. In the above WI-FI link example, τ=2, then $$f = \frac{1}{\tau^P} = \frac{1}{2^{16.7475}} = 9.089 \times 10^{-6}.$$

If there are already individuals in the population that meet the fitness requirement, individuals with the current highest fitness ($f_{max}$) are outputted, otherwise, step S205 is entered.

In S205: a new population is obtained after performing the selection, crossover and mutation operations, and step S204 is repeated until the number of iterative search times is greater than 1000 or a variation error of power consumption results between two adjacent iterations is less than 0.5%.

The selection operation is to select an individual according to the fitness, selecting m individuals with the highest fitness score, m being a preset selection parameter. The crossover operation is to randomly select two individuals as parents, randomly exchange one of power consumption parameters (a difference needs to be generated before and after the exchange), and add the newly generated individuals to the population. The mutation operation is to randomly select a individuals, randomly replace one of power consumption parameters, and add the generated individuals to the population, and the replaced power consumption parameters are to meet the boundary condition of the parameters.

In S3: centralized storage is performed on the link behavior graph in step S1 and the minimum power consumption parameters in step S2, and a link behavior library is constructed according to a corresponding relationship thereof.

Figure 4:
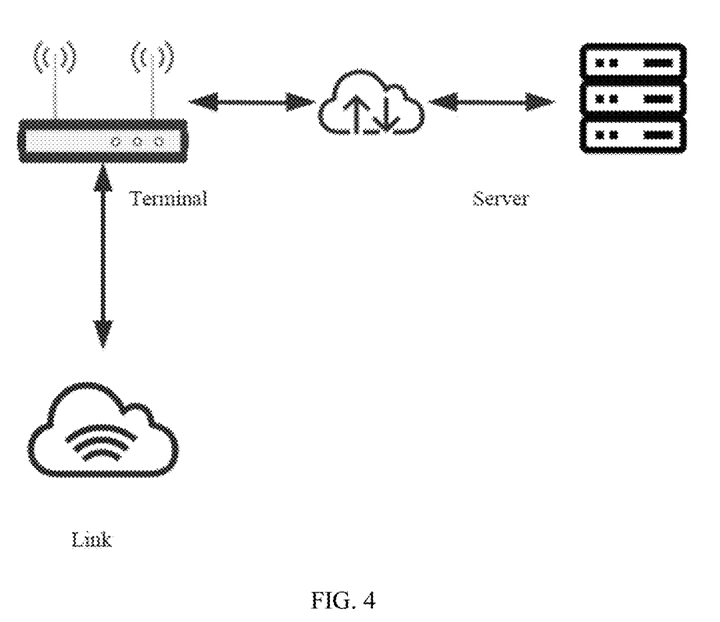
FIG. 4 is a hardware connection diagram in a production environment in an embodiment of the present disclosure.

In S4, as shown in FIG. 4, a practical application scenario of a client IoT device is constructed; and the user terminal needs to perform data communication with a server via the Internet, and regularly sends operation data and collected user link behavior data to the server. The operation data of the user terminal mainly includes time statistics of the user terminal in different states, and the collected user link behavior data mainly includes interaction information of packets, a moment of sending and receiving packets, etc.

The server evaluates whether the power consumption policy of the user terminal needs to be optimized. On the one hand, the evaluation method estimates the average power consumption of the user terminal according to the time when the user terminal is in different states multiplied by a theoretical average current in different states and then divided by a total time. When the estimated power consumption is less than an empirical value, it can be directly determined that an evaluation result is excellent; when the average power consumption is lower than 20 mW, it is determined as excellent; and when the average power consumption is equal to or higher than 20 mW, it needs to be optimized. On the other hand, according to the collected link behavior data, a category of the link behavior is analyzed and it is determined that whether there is other link interaction overhead besides the normal service interaction. If it is found that there is other link interaction overhead, it is directly determined that an evaluation result is below excellent. If it is found that there is no other link interaction overhead and the estimated power consumption is greater than an empirical value, it may be that the estimated power consumption caused by frequent service interactions in a client application scenario exceeds a threshold value. For this case, it is necessary to further calculate a ratio of the estimated power consumption to the number of service packet interactions. If a final ratio is within a reasonable range, the evaluation result can also be excellent, and if a ratio result is not within the range of an empirical value, the evaluation result is below excellent. If an evaluation result is excellent, there is no need to perform policy optimization; and if an evaluation result is below the excellent, step S5 is entered.

In S5: a link behavior subgraph is generated by the server according to the link behavior data collected by the user terminal, and the link behavior subgraph is matched with the link behavior library using a similarity algorithm, minimum power consumption parameters corresponding to a matched link behavior graph from the link behavior library being acquired and step S7 being entered if the matching is successful, otherwise, step S6 being entered, including the following steps.

In S501: the link behavior subgraph is generated by the server according to the link behavior data collected by the user terminal in a single sampling period, including the following steps.

In S5011: all the user terminal behaviors in the link behavior data are traversed, a corresponding item in the user terminal behavior table is found and attributes of parameters are updated to cause attribute data in the user terminal behavior table to be consistent with that in the link behavior data.

In S5012: all link behaviors in the link behavior data are traversed, each link behavior corresponding to a node, and the attribute of the node including, but not limited to, a sending time and a transmission delay of a node behavior.

In S5013: a triggering condition corresponding to each link behavior is parsed according to the link behavior data and constructed in the form of an edge in the behavior graph.

In S502: all link behavior graphs in the link behavior library are traversed, a similarity with the link behavior subgraph is calculated, and a link behavior graph with the highest similarity is obtained. If the highest similarity reaches 0.85, the link behavior subgraph is successfully matched in the link behavior library, optimal power consumption parameters corresponding to the matched link behavior graph are acquired, and step S7 is entered; otherwise, step S6 is entered, including the specific steps:

In S5021: the link behavior subgraph and the matched link behavior graph are represented as an adjacency matrix and a node feature matrix of the graph; and a link behavior subgraph S and a matched link behavior graph T are represented as graph data structures, including node feature matrixes $X_S$ and $X_T$, and adjacency matrixes $A_S$ and $A_T$.

In S5022: a graph matching model based on GCNs is constructed, the link behavior subgraph is taken as an input graph and the matched link behavior graph as a target graph, and matching features of nodes are learned through the graph matching model based on GCNs, including the following.

At each level, the representation of nodes is updated by aggregating neighbor information of nodes and combining features. Assuming that $N(v_i)$ represents a set of neighbor nodes of $v_i$, the neighbor information aggregation of $v_i$ can be represented as:

$$h_{agg}^{(l)}(v_i) = \sum_{v_j \in N(v_i)} \frac{1}{\sqrt{\deg(v_i)\deg(v_j)}} \cdot W^{(l)} h^{(l-1)}(v_j)$$

where $v_i$ represents an $i^{th}$ vector, $W^{(l)}$ represents a weight matrix of an $l^{th}$ layer, $h^{(l-1)}(v_j)$ represents features of $v_j$ at an $(l-1)^{th}$ layer, $h_{agg}^{(l)}(v_i)$ represents the neighbor information aggregation of the vector $v_i$, and $v_j$ represents a $j^{th}$ vector in a set of neighbor nodes of $v_i$.

GCNs consider the self-features of nodes, and takes into account self-features of the vector $v_i$:

$$h_{self}^{(l)}(v_i) = W_{self}^{(l)} h^{(l-1)}(v_i)$$

where $W_{self}^{(l)}$ represents a weight matrix of self-features of an $l^{th}$ layer, $h_{self}^{(l)}(v_i)$ represents a self-feature vector of $v_i$ at the $l^{th}$ layer, and $h^{(l-1)}(v_i)$ represents a feature of the vector $v_i$ at an $(l-1)^{th}$ layer; and the aggregated neighbor information and the self-feature are updated and combined to obtain a new feature of $v_i$ at the $l^{th}$ layer:

$$h^{(l)}(v_i) = \text{ReLU}(h_{agg}^{(l)}(v_i) + h_{self}^{(l)}(v_i))$$

where $h^{(l)}(v_i)$ represents a total feature vector of $v_i$ at the $l^{th}$ layer;

Through multi-layer GCNs network stacking, the node representation of each layer can be taken as an input of a next layer; and the multi-layer network stacking may gradually extract more advanced features for expressing the structure and information of the graph.

In S5023: a cosine similarity between nodes is calculated by using the learned matching feature, specifically expressed as:

$$\text{Cosine Similarity}(v_i, v_j) = \frac{\sum_{k=1}^{G} v_{i,k} \times v_{j,k}}{\sqrt{\sum_{k=1}^{G} v_{i,k}^2} \times \sqrt{\sum_{k=1}^{G} v_{j,k}^2}}$$

where Cosine Similarity($v_i$, $v_j$) represents a cosine similarity between two vectors $v_i$ and $v_j$, k represents dimensional indexing of the vector, G represents a dimension of the vector, $v_{i,k}$ represents a component of the vector $v_i$ in a $k^{th}$ dimension, and $v_{j,k}$ represents a component of the vector $v_j$ in a $k^{th}$ dimension.

In S5024: a node matching result between the link behavior subgraph and the matched link behavior graph is outputted according to the cosine similarity; and the matching of the nodes between the link behavior subgraph and the matched link behavior graph is completed by adjusting model parameters according to a matching result through several rounds of iteration and optimization.

In S6: secondary generation is performed on the link behavior subgraph generated in step S5 through a graph neural network generation algorithm to obtain a complete link behavior graph, the link behavior graph is inputted into the SBO system in step S2, and minimum power consumption parameters of a new link are obtained, including the following steps.

In S601, the link behavior subgraph is coded, and subgraph data is inputted into the graph neural network GCNs in the forms of adjacency matrixes and node feature matrixes. The graph neural network learns the node feature representation of subgraph through multi-layer node feature propagation and aggregation.

In S602: the node features of the link behavior subgraph are fused to obtain a feature representation of an overall subgraph.

In S603: new nodes and edges are generated by using a generative adversarial network model to construct a structure of the complete link behavior graph; and a node feature is generated, and the feature and a subgraph node feature are fused to obtain a feature representation of the complete link behavior graph.

In S604, by removing repeated edges and ensuring the connectivity of the graph, the structure of the complete link behavior graph is optimized and repaired, and a complete link behavior graph which is more practical and meets the application requirements of the link behavior graph is obtained.

In summary, an overall flow of generation of a complete graph from subgraphs in step S6 includes key steps such as subgraph input, subgraph feature encoding, graph structure generation, node feature generation, graph feature fusion and graph structure optimization. These steps jointly complete the generation process from the subgraphs to the complete graph, and the goal of efficient and accurate generation from the subgraphs to the complete graph is achieved through the cooperation of the graph neural network and a generation model.

In S7: the minimum power consumption parameters are transmitted by the server to the user terminal through networking, and a parameter update instruction is issued to complete the upgrading of the power consumption policy of the user terminal.

The above is only an exemplary embodiment of the present disclosure, which does not limit the scope of protection of the present disclosure. Any equivalent structure or equivalent process transformation made by using the contents of the specification and drawings of the present disclosure, or directly or indirectly applied to other related technical fields, are equally included in the scope of protection of the present disclosure.

The invention claimed is:

1. An online optimization method for a power consumption policy of a terminal of Internet of things (IoT), comprising:
    S1: performing comprehensive scanning on a user terminal and a link, and obtaining a link behavior graph according to behavior data of the link, comprising the following specific steps:
    S101: monitoring, by using a link analysis tool, interaction behaviors and relevant data between the user terminal and the link, comprising a category of interaction behaviors, specific content, behavior time, processing delay and transmission delay; and sampling and analyzing, by using a power consumption analysis device and a logic analysis device, a real-time current and a working state of the user terminal to obtain a sectional working state and an average current of each user terminal behavior;
    S102: controlling the user terminal to maintain a passive response state, monitoring, by using a packet grabber, an active packet sending behavior of the link, and recording subsequent interaction behaviors and relevant data between the user terminal and the link;
    S103: summarizing the interaction behaviors occurring in the link according to a link protocol to obtain a test behavior set of the link, sequentially selecting each item in the test behavior set as a to-be-tested behavior, controlling the user terminal to initiate the to-be-tested behavior to the link, monitoring, by using the link analysis tool, the interaction behaviors between the user terminal and the link, and recording the relevant data;
    S104: classifying and summarizing the interaction behaviors acquired in steps S102 and S103, a part belonging to user terminal behaviors constituting a user terminal behavior table, wherein field content of the table comprises a category, specific content, behavior time, processing delay, transmission delay, a sectional working state of the user terminal behavior and a corresponding average current; a part belonging to the link behavior generating a link behavior graph of the link, wherein the link behavior graph comprises nodes and edges, the node representing behavior content of the link, which is usually a packet sending behavior, and the node comprising a behavior category, a behavior time, a processing delay and a transmission delay; and the edge representing a triggering condition of the behavior; and
    S105: repeating steps S101 to S104 until all to-be-tested links generate link behavior graphs;
    S2: inputting the link behavior graph in step S1 into a simulation based optimization (SBO) system to obtain power consumption parameters for minimizing power consumption of the user terminal, comprising the following specific steps:
    S201: defining average currents of the user terminal in n working states s1, s2 . . . sn as c1, c2 . . . cn, respectively, the average power consumption P of the user terminal being P=(c1*t1+c2*t2 . . . +cn*tn)/(t1+t2+ . . . +tn)*V, where t1, t2 . . . tn represent the time when the user terminal is in different working states, and V represents an input voltage of the user terminal;
    S202: characterizing a power consumption policy of the user terminal by using a parameter; and
    S203: selecting a genetic algorithm as an optimization algorithm of the SBO system, searching for a set of power consumption parameters for minimizing power consumption within a parameter range, and continuously iterating until the number of iterative search times is greater than a preset threshold number of times or a variation error of a power consumption result between two adjacent iterations is less than a set value;
    S3: performing centralized storage on the link behavior graph in step S1 and the power consumption parameters in step S2, and constructing a link behavior library according to a corresponding relationship thereof;
    S4: regularly sending, by the user terminal, operation data and collected user link behavior data to a server, and evaluating, by the server, whether the power consumption policy of the user terminal needs to be optimized, an original state being maintained if optimization is not needed until the user terminal collects data next time, and step S5 being entered if optimization is needed; determining whether optimization is needed comprising the following steps:
    recording a time proportion of the user terminal in a sleep state within a period of time, optimization being needed when the time proportion is lower than a threshold value, otherwise, optimization being not needed;
    S5: generating, by the server, a link behavior subgraph according to the link behavior data collected by the user terminal, and matching the link behavior subgraph with the link behavior library in step S3 using a similarity algorithm, power consumption parameters of minimum power consumption corresponding to a matched link behavior graph from the link behavior library being acquired and step S7 being entered if the matching is successful, otherwise, step S6 being entered, comprising the specific steps:
    S501: generating, by the server, the link behavior subgraph according to the link behavior data collected by the user terminal in a single sampling period, comprising the following steps:

S5011: traversing all the user terminal behaviors in the link behavior data, finding a corresponding item in the user terminal behavior table and updating attributes of parameters to cause attribute data in the user terminal behavior table to be consistent with that in the link behavior data;

S5012: traversing all link behaviors in the link behavior data, each link behavior corresponding to a node, and the attribute of the node comprising a sending time and a transmission delay of a node behavior; and S5013: parsing a triggering condition corresponding to each link behavior according to the link behavior data and constructing the same in the form of an edge in the behavior graph;

S502: traversing all link behavior graphs in the link behavior library, calculating a similarity with the link behavior subgraph, and obtaining a link behavior graph with the highest similarity, if the highest similarity reaches a preset similarity threshold value, the link behavior subgraph being successfully matched in the link behavior library, power consumption parameters of minimum power consumption corresponding to the matched link behavior graph being acquired, and step S7 being entered; otherwise, step S6 being entered, comprising the specific steps:

S5021: representing the link behavior subgraph and the matched link behavior graph as an adjacency matrix and a node feature matrix of the graph;

S5022: constructing a graph matching model based on graph convolution networks (GCNs), taking the link behavior subgraph as an input graph and the matched link behavior graph as a target graph, and learning matching features of nodes, comprising:

aggregating neighbor information about the node, specifically expressed as:

$$h_{agg}^{(l)}(v_i) = \sum_{v_j \in N(v_i)} \frac{1}{\sqrt{\deg(v_i)\deg(v_j)}} \cdot W^{(l)} h^{(l-1)}(v_j)$$

where $W^{(l)}$ represents a weight matrix of an $l^{th}$ layer, $h^{(l-1)}(v_j)$ represents a feature of $v_j$ at an $(l-1)^{th}$ layer, $h_{agg}^{(l)}(v_i)$ represents the neighbor information aggregation of a vector $v_i$, and $N(v_i)$ represents a set of neighbor nodes of the vector $v_i$;

taking into account self-features of the vector $v_i$, specifically expressed as:

$$h_{self}^{(l)}(v_i) = W_{self}^{(l)} h^{(l-1)}(v_i)$$

where $W_{self}^{(l)}$ represents a weight matrix of self-features of an $l^{th}$ layer, $h_{self}^{(l)}(v_i)$ represents a self-feature vector of a vector $v_i$ at the $l^{th}$ layer, and $h^{(l-1)}(v_i)$ represents a feature of the vector $v_i$ of an $(l-1)^{th}$ layer; and updating and combining the aggregated neighbor information and the self-features to obtain a new feature of the vector $v_i$ at the $l^{th}$ layer, specifically expressed as:

$$h^{(l)}(v_i) = \text{ReLU}(h_{agg}^{(l)}(v_i) + h_{self}^{(l)}(v_i));$$

where $h^{(l)}(v_i)$ represents a total feature vector of the vector $v_i$ at the $l^{th}$ layer;

S5023: calculating a cosine similarity between nodes by using the learned matching features, specifically expressed as:

$$\text{Cosine Similarity}(v_i, v_j) = \frac{\sum_{k=1}^{G} v_{i,k} \times v_{j,k}}{\sqrt{\sum_{k=1}^{G} v_{i,k}^2} \times \sqrt{\sum_{k=1}^{G} v_{j,k}^2}}$$

where Cosine Similarity($v_i$, $v_j$) represents a cosine similarity between two vectors $v_i$ and $v_j$, $v_i$ represents an $i^{th}$ vector, $v_j$ represents a $j^{th}$ vector in a set of neighbor nodes of $v_i$, k represents dimensional indexing of the vector, G represents a dimension of the vector, $v_{i,k}$ represents a component of the vector $v_i$ in a $k^{th}$ dimension, and $v_{j,k}$ represents a component of the vector $v_j$ in a $k^{th}$ dimension; and S5024: outputting a node matching result between the link behavior subgraph and the matched link behavior graph according to the cosine similarity; and completing the matching of the nodes between the link behavior subgraph and the matched link behavior graph by adjusting model parameters iteratively and optimally;

S6: performing secondary generation on the link behavior subgraph generated in step S5 through a graph neural network generation algorithm to obtain a complete link behavior graph, inputting the link behavior graph into the SBO system in step S2, and obtaining power consumption parameters of minimum power consumption of a new link, comprising the following steps:

S601: encoding the link behavior subgraph, inputting the adjacency matrix and the node feature matrix into the graph matching model based on GCNs, and learning node features of the subgraph through multi-layer node feature propagation and aggregation;

S602: fusing the node features of the link behavior subgraph to obtain a feature representation of an overall subgraph;

S603: generating new nodes and edges by using a generative adversarial network model to construct a structure of the complete link behavior graph; and generating a node feature, and fusing the feature and a subgraph node feature to obtain a feature representation of the complete link behavior graph; and S604: optimizing and repairing the structure of the complete link behavior graph by removing repeated edges to obtain the complete link behavior graph; and S7: transmitting, by the server, the power consumption parameters of minimum power consumption to the user terminal through networking, and issuing a parameter update instruction to complete the upgrading of the power consumption policy of the user terminal.

* * * * *